United States Patent Office 3,221,042
Patented Nov. 30, 1965

3,221,042
O-BENZYLAMINOALKYL-N-PHENYLURETHANES
Alfred Margot, Basel, Switzerland
No Drawing. Original application Jan. 19, 1962, Ser. No. 167,406. Divided and this application Feb. 7, 1963, Ser. No. 263,673
Claims priority, application Switzerland, Jan. 20, 1961, 695/61
3 Claims. (Cl. 260—472)

This application is a division of application Serial No. 167,406, filed January 19, 1962.

This invention relates to new quaternary O-benzylaminoalkyl-N-phenylurethanes.

The new O-benzylaminoalkyl-N-phenylurethanes have the formula

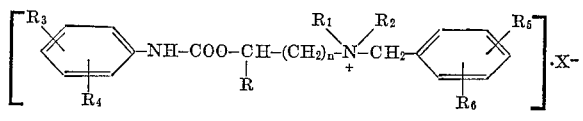

(I)

in which R represents hydrogen or a methyl group, $R_1$ and $R_2$ represent lower alkyl groups or both groups together with the adjacent nitrogen atom form a pyrrolidine- or preferably a piperidine nucleus, $R_3$, $R_4$, $R_5$ and $R_6$, each independent of one another, represent hydrogen, a methyl, methoxy, methylmercapto or nitro group or a halogen atom, especially chlorine, $n$ represents the number 1 or 2, and $X^-$ represents the anion of a physiologically non-toxic acid, especially a halide anion. Those compounds possess pronounced anthelmintic properties and are suitable for the intertherapeutic control of parasitic and pathogenic worms, especially of parasitic nematodes living in the intestinal tract of domestic and other useful animals.

In the above, the lower alkyl groups $R_1$ and $R_2$ are alkyl groups containing 1 to 4 carbon atoms, e.g. methyl, ethyl, propyl, isopropyl, butyl, tert. butyl and sec. butyl. Generally, $R_1$ and $R_2$ are represented by identical lower alkyl radicals, preferably by methyl- or ethyl radicals. When $R_1$ and $R_2$ are taken together with the adjacent nitrogen atom, they represent preferably an unsubstituted piperidine ring. If one or more of the radicals $R_3$ to $R_6$ are represented by halogen, the preferred halogen substituent is chlorine. Preferred compounds are those wherein all radicals $R_3$ to $R_6$ are hydrogen or which are monosubstituted in one or both phenyl nuclei. Particularly active are also compounds wherein both radicals $R_5$ and $R_6$ are methyl groups.

In the above Formula I the type of anion $X^-$ is not important for the activity; however, the anion must be physiologically compatible, i.e. not impart to the aforesaid quaternary phenylurethanes toxicity to domestic animals. The preferred anion is a halide, such as $Cl^-$, $Br^-$ and $I^-$, which halide-anions may be replaced by others, e.g. by methosulphate-, phosphate-, lactate-, acetate- or citrate- anions and so forth.

The new compounds of the general Formula I may also be used as anthelmintics in human medicine and possess also coccidiostatic properties.

The above-defined N-quaternary O-benzylamino-alkyl-N-phenyl-urethanes of Formula I are prepared by forming the quaternary compounds of N-substituted O-aminoalkyl-N-phenyl-urethanes of the general formula

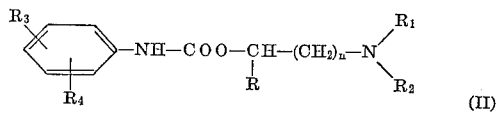

(II)

in which R, $R_1$, $R_2$, $R_3$, $R_4$ and $n$ have the meanings given above, in known way with an ester of a possibly nuclear-substituted benzyl alcohol, especially a possibly nuclear-substituted benzyl halide, of the general formula

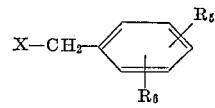

(III)

in which X, $R_5$ and $R_6$ have the meanings given above.

According to a further process, compounds of the general Formula I are obtained when a quaternary compound of an ester, especially a halide, of an O-hydroxyalkyl-N-phenylurethane of the general formula

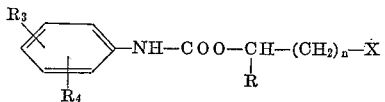

(IV)

in which R, $R_3$, $R_4$, X and $n$ have the meanings given above, is formed with an N-substituted benzylamine of the general formula

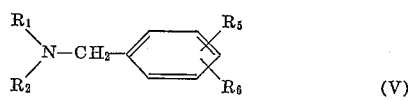

(V)

in which $R_1$, $R_2$, $R_5$ and $R_6$ are as defined above.

Compounds of the general Formula I, in which $R_1$ and $R_2$ signify lower alkyl residues, are also obtained when an O-benzylaminoalkyl-N-phenyl-urethane of the general formula

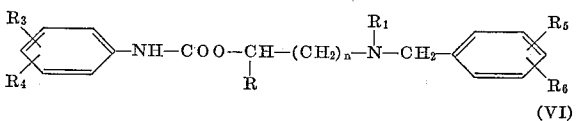

(VI)

in which $R_1$, represents a lower alkyl residue and R, $R_3$, $R_4$, $R_5$, $R_6$ and $n$ have the meaning given at the beginning, are treated with an agent which produces a quaternary compound and introduces a lower alkyl residue $R_2$. (quaternizing agent).

Further, compounds of the general Formula I can also be obtained by reacting an N-quaternary benzylaminoalkanol of the general formula

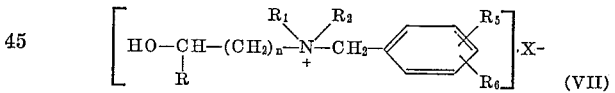

(VII)

in which R, $R_1$, $R_2$, $R_5$, $R_6$, $n$ and X have the meanings mentioned at the beginning, with a phenyl isocyanate of the general formula

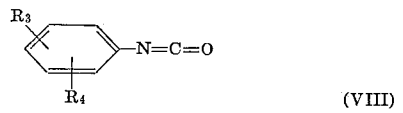

(VIII)

or condensing this alkanol of the general Formula VII with a phenylcarbamic acid halide of the general formula

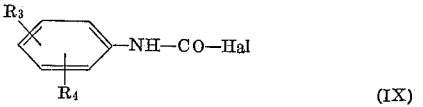

(IX)

with splitting off of hydrogen halide, or with a phenylurea of the general formula

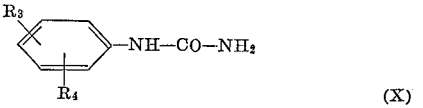

(X)

with splitting off of ammonia.

Finally, compounds of the general Formula I are also obtained when a possibly substituted aniline of the general formula

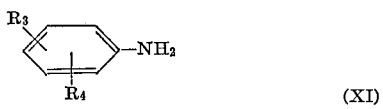

(XI)

is reacted with an N-quaternary chloroformic acidbenzyl-aminoalkanol ester of the general formula

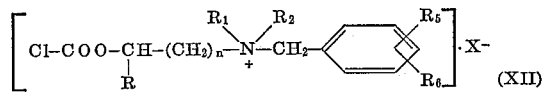

(XII)

with splitting off of hydrochloric acid, or with the corresponding cyanoformic acid ester with splitting off of HCN, or finally with a carbonic acid diester of the general formula

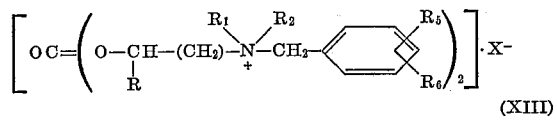

(XIII)

with splitting off of a mol of an alkanol of the Formula VII. In the above Formulae VIII to XIII the symbols occurring therein have the meanings mentioned earlier.

The reactions of an amine of the Formula XI with a chloroformic acid ester of the Formula XII, as well as of an alkanol of the Formula VII with an isocyanate of the general Formula VIII or with a phenylcarbamic acid halide of the Formula IX proceed particularly smoothly and in consequence, in addition to the preferred process of forming quaternary compounds, are suitable especially for the production of compounds of the Formula I.

The starting substances of the general Formula II needed for the first-named process of preparation are in some cases known or may be prepared by known methods, e.g. by reacting a possibly correspondingly nuclear-substituted phenylisocyanate or phenylcarbamic acid chloride with an aminoalkanol N-substituted in desired way, such as, for example, β-dimethylaminoethanol, γ-diethylaminopropanol, etc.

The following may be mentioned as examples of starting substances of the general Formula II:

O-(β-dimethylaminoethyl)-N-phenylurethane,
O-(γ-dimethylaminopropyl)-N-phenylurethane,
O-(β-dimethylamino-α-methylethyl)-N-phenylurethane,
O-(β-diethylaminoethyl)-N-phenylurethane,
O-(β-piperidinoethyl)-N-phenylurethane,
O-(β-1-pyrrolidinoethyl)-N-phenylurethane,
O-(β-dimethylaminoethyl)-N-4-chlorophenylurethane,
O-(β-dimethylaminoethyl)-N-2,4-dichlorophenylurethane,
O-(β-dimethylaminoethyl)-4-nitrophenylurethane,
O-(β-dimethylaminoethyl)-N-4-methylmercaptophenylurethane,
O-(β-dimethylaminoethyl)-N-4-methoxyphenylurethane, and
O-(β-dimethylaminoethyl)-N-4-methylphenylurethane, as well as further starting substances which carry in the benzene nucleus of the phenylurethane residue one to two substituents according to the definition of $R_3$ and $R_4$.

As examples of known starting substances of the general Formula III may be named benzyl chloride, 4-chlorobenzyl chloride, 3,4,-dimethylbenzyl chloride and 4-nitrobenzyl chloride.

The starting substances of the general Formula IV used for the second-named process of preparation are also known to some extent or can be prepared by known processes, e.g. in an analogous way to the compounds of Formula II from phenyl isocyanates or phenylcarbamic acid chlorides and haloalkanols, such as, for example, β-chlorethanol etc. or other monoesters of aliphatic diols, such as, for example, the mono-p-toluenesulphonic acid ester of ethylene glycol or propylene glycol. As examples of starting substances of the general Formula IV may be mentioned: O-(β-chlorethyl)-N-phenylurethane, O-(β-bromethyl)-N-phenylurethane, O-(β-p-toluenesulphonyl-ethyl)-N-phenylurethane, and also phenylurethanes corresponding to the starting substances of the general Formula II with a chlorine or bromino atom instead of the substituted amino group.

As starting substances of the general Formula V may be mentioned, for example, the following N-substituted benzylamines: N,N-dimethylbenzyl-amine, N,N-dimethyl-4-chlorobenzylamine, N,N-dimethyl-4-nitrobenzylamine, N,N-diethylbenzylamine and 1-benzylpiperidine.

The starting substances of the general Formula VI for the third-named process of preparation can be prepared by similar methods to those described above for the starting substances of the Formulae II and III, e.g. from correspondingly substituted phenyl isocyanates or phenyl carbamic chlorides and suitably substituted benzylaminoalkanols.

Suitable agents for forming the quaternary compounds of the compounds of the Formula VI are, for example, methyl chloride, methyl bromide, methyl iodide, dimethyl sulphate, ethyl chloride, ethyl bromide, ethyl iodide and diethyl sulphate.

The starting substances of the general Formula VII for further processes of preparation are likewise known to some extent or are readily available by known processes for quaternary compound formation. For example, they may be obtained by reaction of haloalkanols with suitably substituted benzylamines and subsequent conversion of the amino group into the quaternary structure.

Suitably substituted phenyl isocyanates of the general Formula VIII, phenylcarbamyl halides of the general Formula IX and phenylureas of the general Formula X are known compounds.

Starting substances of the general Formula XII for the last-named process of preparation, likewise partly known, may be obtained, for example, when benzylamines, possibly suitably substituted, are reacted with a haloalkanol to give the corresponding benzylaminoalkanol, and this is reacted with an equimolecular amount of phosgene and finally the amino group is converted into the quaternary structure. The corresponding cyanoformic acid esters or carbonic acid diesters of Formula XIII can also be prepared by known methods. As known starting substances of the general Formula XI may be named: aniline, 4-chloraniline, 4-nitroaniline, 2,4-dichloraniline, 4-methylmercapto-aniline, o-toluidine and so on.

In the reactions in which acid is split off, acid-binding agents are advantageously used, such as, for example, sodium or potassium carbonate, and all reactions are preferably carried out in inert organic solvents at low temperatures or with heating.

The following examples illustrate the preparation of the new compounds according to the invention. Parts therein are parts by weight and the temperatures are given in degrees centigrade.

*Example 1*

20.8 parts of phenylcarbamic acid-β-dimethylaminoethylester are dissolved in 200 parts of dry acetone and 12.6 parts of benzyl chloride are added. On standing at room temperature, crystallisation sets in after a few hours, and is completed after a day. The crystals are filtered off by suction and the residue is washed with dry acetone. The N-(phenylcarbamyloxyethyl)-N-benzyl-N,N-dimethyl ammonium chloride obtained in practically quantitative yield melts at 203–205° with decomposition.

When using in a similar way the corresponding analogous starting materials, the following compounds are obtained: N-(4-nitrophenylcarbamyloxyethyl)-N,N-dimethyl ammonium chloride, M.P. 230° (decomposition), N-(4-chlorophenylcarbamyloxyethyl)-N-(3',4'-dimethylbenzyl)-N,N-dimethyl ammonium chloride, M.P. 175–

177°, N-(phenylcarbamyloxyethyl)-N-benzyl-N,N-diethyl ammonium chloride, hygroscopic, resinous, N-(phenylcarbamyloxypropyl)-N-benzyl-N,N-dimethyl ammonium chloride, M.P. 210° (decomposition).

Example 2

11.9 parts of phenyl isocyanate are allowed to flow into a mixture of 8.9 parts of β-dimethylaminoethanol and 50 parts of absolute benzene at 20–40° with stirring and a little cooling. After it has been heated at 65–70° for 1 hour, 17.1 parts of benzyl bromide are allowed to flow in at the same temperature, without isolating the phenylcarbamic acid-β-dimethylaminoethyl ester formed. N-(phenylcarbamyloxyethyl)-N-benzyl-N,N-dimethyl ammonium bromide is formed which immediately precipitates. The mixture is allowed to cool and the product is filtered off by suction. It melts at 169–171°.

When reacting correspondingly substituted phenyl isocyanates and benzyl chlorides with dimethylaminoethanol, the following compounds are obtained in an analogous manner:

N-(4-methylphenyl carbamyloxyethyl)-N-benzyl-N,N-dimethyl ammonium chloride, M.P. 215–216°,
N-(4-methylphenyl carbamyloxyethyl)-N-(4-chlorobenzyl)-N,N-dimethyl ammonium chloride, M.P. 215–216°,
N-(4-methoxyphenyl carbamyloxyethyl)-N-benzyl-N,N-dimethyl ammonium chloride, M.P. 196–197°,
N-(phenylcarbaminyloxyethyl)-N-(4-nitrobenzyl)-N,N-dimethyl ammonium chloride, M.P. 206–208°.

When reacting phenyl isocyanate with 1-dimethylaminopropanol-2 and benzyl chloride, N-[(β-phenylcarbaminyloxy)-propyl]-N-benzyl-N,N-dimethyl ammonium chloride of M.P. 188–190° is obtained; the reaction between phenyl, isocyanate, 2-piperidine-ethanol-1 and benzyl chloride results in the N-(phenylcarbaminyloxyethyl)-N-benzylpiperidinium chloride of M.P. 201–202°.

Example 3

20 parts of phenylcarbamic acid-β-chloroethyl ester together with 13.5 parts of N,N-dimethylbenzylamine in 200 parts of dry acetone are heated under reflux for several hours. The N-(phenylcarbamyloxyethyl)-N-benzyl-N,N-dimethyl ammonium chloride thereby precipitated is filtered off by suction and washed with dry acetone. It melts at 203–205° with decomposition.

Example 4

6 parts of phenyl isocyanate are added at 30–40° to a solution of N-methyl-N-(β-hydroxyethyl)-benzylamine. The mixture is heated at 50° for a further hour, and then cooled to room temperature. Without isolating the N-(phenylcarbamyloxyethyl)-N-methyl-benzylamine formed, the solution is treated with a mixture of 7 parts of methyl iodide and 50 parts of acetone and allowed to stand at room temperature for a few hours. The precipitated N-(phenylcarbamyloxyethyl)-N-benzyl-N,N-dimethyl ammonium iodide is filtered off by suction and washed with a little acetone. The colourless product melts at 140°–142°.

Example 5

21.5 parts of N-benzyl-N,N-dimethyl-N(β-hydroxyethyl) ammonium chloride, which has been obtained from benzyl chloride and dimethylamino-ethanol, are suspended in 100 parts of absolute benzene and 11.9 parts of phenyl isocyanate are added. The mixture is heated under reflux for a few hours with good stirring, the N-(phenylcarbamyloxyethyl)-N-benzyl-N,N-dimethyl ammonium chloride formed, after cooling, is filtered off by suction and washed with absolute benzene. It melts at 203–205° with decomposition and is identical with the product obtained according to Example 1.

The new inner therapeutically active substances are usually administered orally to domestic and other useful animals such as dogs, cats, sheep, cattle, horses, poultry etc., which animals are infested with intestinal parasitic nematodes, especially Oxyuridae and Ascaridae etc. The active substances can either be force-fed per se to the animals by means of a funnel, or better yet administered in the form of powder, tablets, gelatine capsules, boluses and drench solutions.

The active substances can also be administered rectally and cattle could possibly be treated by means of intramuscular or subcutanous injections.

The therapeutic dosage is such that the infesting intestinal parasites are destroyed but without having any derogatory effect upon the animal being treated. The dosage varies with the type of parasite that is to be eliminated and also with the animal being treated; in some cases a single dose is enough, at others, the therapy is more prolonged. The daily therapeutic dosage recommended for oral administration is in the range of 100 to 1000 mg./kg. body-weight, however, it may also be lower or higher.

The active substance is preferably administered orally in combination with a physiologically inert excipient, for instance mixed with additives, e.g. water, ethanol, edible oils, syrups or milk. Or again the active substance may be administered in combination with surface active agents such as liquid and solid emulsifiers to form dispersible powders, or with carriers such as edible powders, foodstuffs for domestic and other animals including the usual commercial feeds. These therapeutic compositions can thus be prepared in form of powders, pills, capsules, boluses, pap, food additives, or concentrations which can be used to administer the desired therapeutic dose. In its liquid form, i.e. aqueous suspension, the active compositions may be stirred into water, milk or other animal drench solutions. Finally, the active ingredient may be filled into gelatine capsules with or without other excipient and administered to the animal directly.

The new active substances are not only outstandingly active against Oxyuridae, but especially also against Ascaridae which infest mammals and poultry.

The effectiveness of N-(phenyl-carbamyloxyethyl)-N-benzyl-N,N-dimethyl-ammonium chloride (I) on Ascaridae was tested in the following manner:

Five 6 weeks old chickens infested with 30 to 50 parasites of the genus *Ascaridia galli*, each, were fed 5 days ad libitum with a standard feed, containing 2% of the above mentioned active ingredient I. Daily the number of worms passing in the fecal matter of each chicken was noted. On the sixth day the chickens were killed, sectioned and the number of worms remaining in the intestines counted. The average results obtained from the five chickens are:

|  | 1st day | 2nd day | 3–6th day |
| --- | --- | --- | --- |
| Total number of Ascaridae eliminated | 30 | 28 | 0 |
| Number of Ascaridae found in intestine at section |  |  | 0 |

The active substance was 100% efficient, while no side effects could be detected on the chickens.

N-(phenylcarbamyloxy ethyl)-N-benzyl-N,N-dimethyl-ammonium chloride has a $DL_{50}$ of 2600 mg./kg. for the mouse and a $DL_{50}$ of 3000 mg./kg. for the rat.

The known active substance 3-ethyl-2[5-(3-ethyl-2-benzthiazolinyl-idene]-1,3-pentadienyl-benzthiazolium iodide, oral dosage 1000 mg./kg. bodyweight had only a fraction of the effectiveness of (I) and caused serious toxic side effects on the tested animals.

What is claimed is:

1. A quaternary O-benzylaminoalkyl-N-phenylurethane of the formula

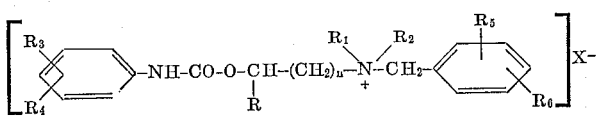

wherein R is a member selected from the group consisting of hydrogen and methyl, $R_1$ is a lower alkyl,
$R_2$ is a lower alkyl,
$R_1$ and $R_2$ when taken together with the adjacent nitrogen atom is a member selected from the group consisting of an unsubstituted piperidine ring and an unsubstituted pyrrolidine ring,
$R_3$, $R_4$, $R_5$ and $R_6$ are each independently selected from the group consisting of hydrogen, methoxy, methylmercapto, nitro and chlorine,
$n$ is a whole number from 1 to 2, and
$X^-$ is the anion of a physiologically acceptable acid not imparting to the said quaternary phenylurethane toxicity to domestic animals.

2. A quaternary O-benzylaminoalkyl-N - phenylurethane as in claim 1 wherein R is hydrogen, $R_1$ and $R_2$ are methyl, and $R_3$, $R_4$, $R_5$ and $R_6$ are hydrogen.

3. A quaternary O-benzylaminoalkyl-N-phenylurethane as in claim 1 wherein R is hydrogen, $R_1$ and $R_2$ are methyl, $R_3$ is hydrogen, $R_4$ is the 4-chloro group, and $R_5$ and $R_6$ are the 3-methyl and 4-methyl groups respectively.

References Cited by the Examiner

UNITED STATES PATENTS 2,109,492    3/1938    Lott et al. _____ 260—472

LEON ZITVER, *Primary Examiner.*

DANIEL D. HORWITZ, *Examiner.*